June 14, 1949.  A. C. THOMPSON  2,473,313
LAWN MOWER GRINDER

Filed Sept. 10, 1947  3 Sheets-Sheet 1

Inventor
Albert C. Thompson

By *Clarence A. O'Brien
and Harvey B. Jackson*
Attorneys

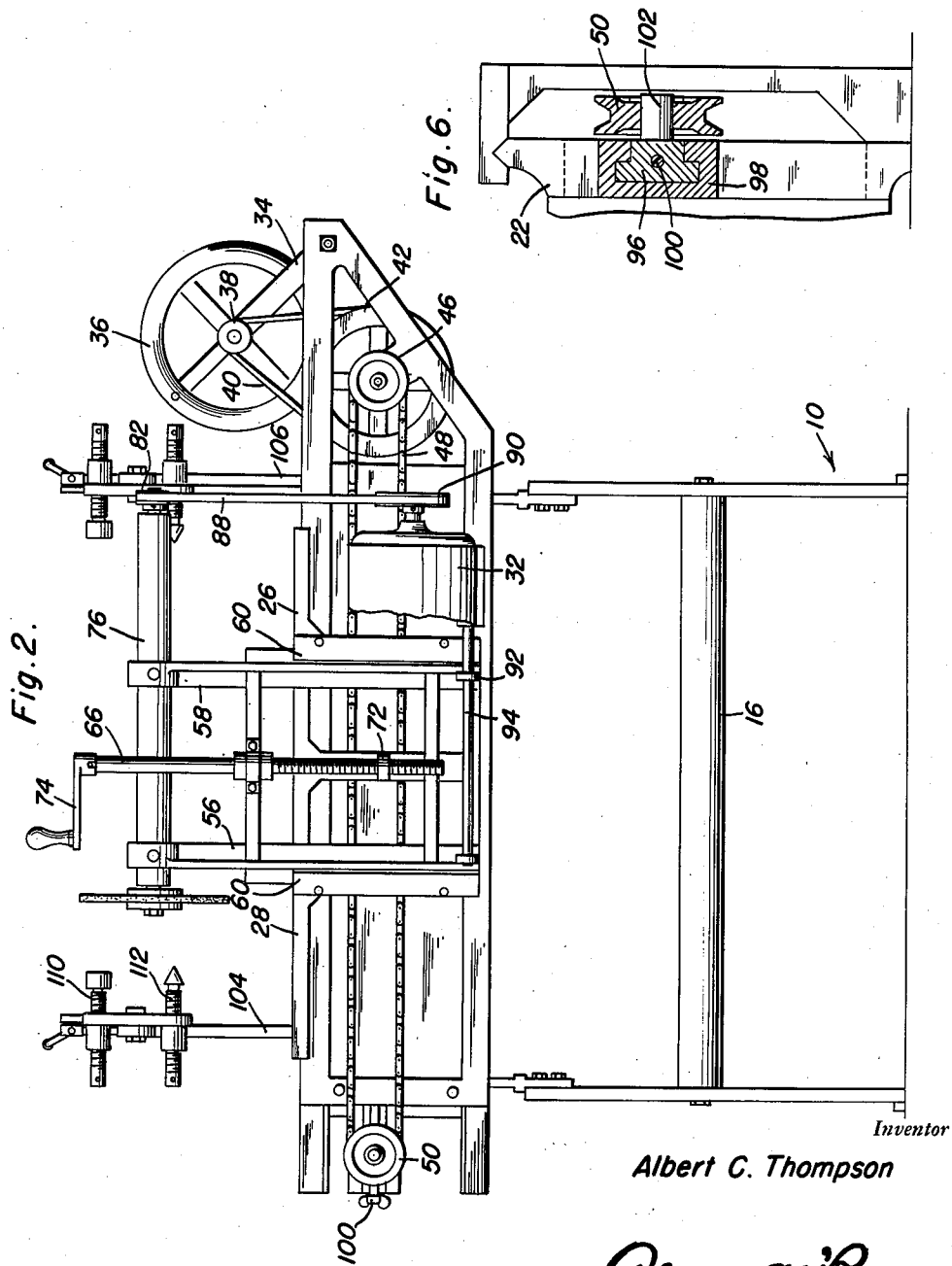

June 14, 1949.　　　A. C. THOMPSON　　　2,473,313
LAWN MOWER GRINDER
Filed Sept. 10, 1947　　　　　　　　　　　3 Sheets-Sheet 3
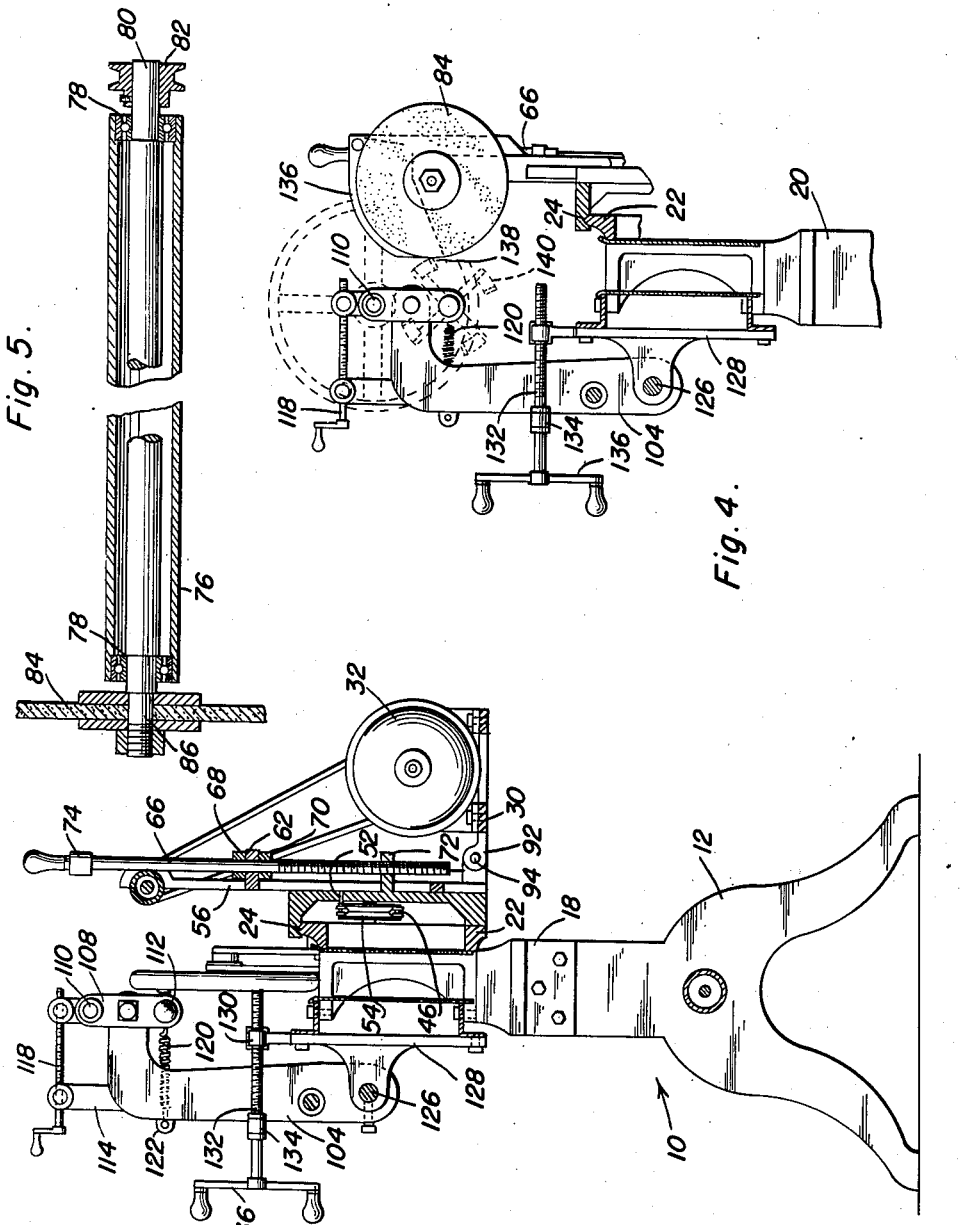
Inventor
Albert C. Thompson Patented June 14, 1949

2,473,313

UNITED STATES PATENT OFFICE 2,473,313

LAWN MOWER GRINDER

Albert C. Thompson, Fountain City, Tenn.

Application September 10, 1947, Serial No. 773,258

1 Claim. (Cl. 51—48)

This invention appertains to novel and useful improvements in machine tools, particularly that class of machine tool which is adapted to perform special jobs.

An object of this invention is to efficaciously and conveniently grind the blades of a lawn mower without removing the said blades from the housing normally associated therewith.

Another object of this invention is to provide means for carrying out the above mentioned function.

A further object of this invention is to provide a novel and improved support for retaining a lawn mower in a fixed, desired position.

Another purpose of this invention is to provide means for grinding the blades of the said lawn mower and for simultaneously grinding and rotating conventional arcuate blades in order to provide a surface normal to the said abrading means at all positions during the cycle of operation.

Another purpose of this invention is to provide improved means for actuating the abrading means in planes mutually perpendicular.

Another purpose of this invention is to provide an improved method of sharpening lawn mowers.

Another purpose of this invention is to retain a lawn mower in a fixed position while grinding the blades thereof by moving an abrading means in a single plane against the said mower blades and simultaneously rotating the said blades.

Ancillary objects and features of novelty will become apparent to those skilled in the art, in following the description of the preferred form of the present invention, illustrated in the accompanying drawings, wherein:

Figure 2 is a side view of the invention shown in Figure 1, taken from the opposite side thereof;

Figure 3 is a transverse sectional view of the invention shown in Figure 1 and taken substantially on the line 3—3 thereof and in the direction of the arrows;

Figure 4 is a fragmentary sectional view of the invention shown in Figure 1 and taken substantially in the direction of the arrows indicated at 4—4;

Figure 5 is a longitudinal sectional view of the abrading means including the retaining means for the said abrading means;

Figure 6 is a sectional view of the invention shown in Figure 1 and taken substantially on the line 6—6 thereof and in the direction of the arrows.

Referring now in detail to the illustrated preferred embodiment of the present invention, like reference characters are used throughout to indicate similar elements thereof.

Figure 1:
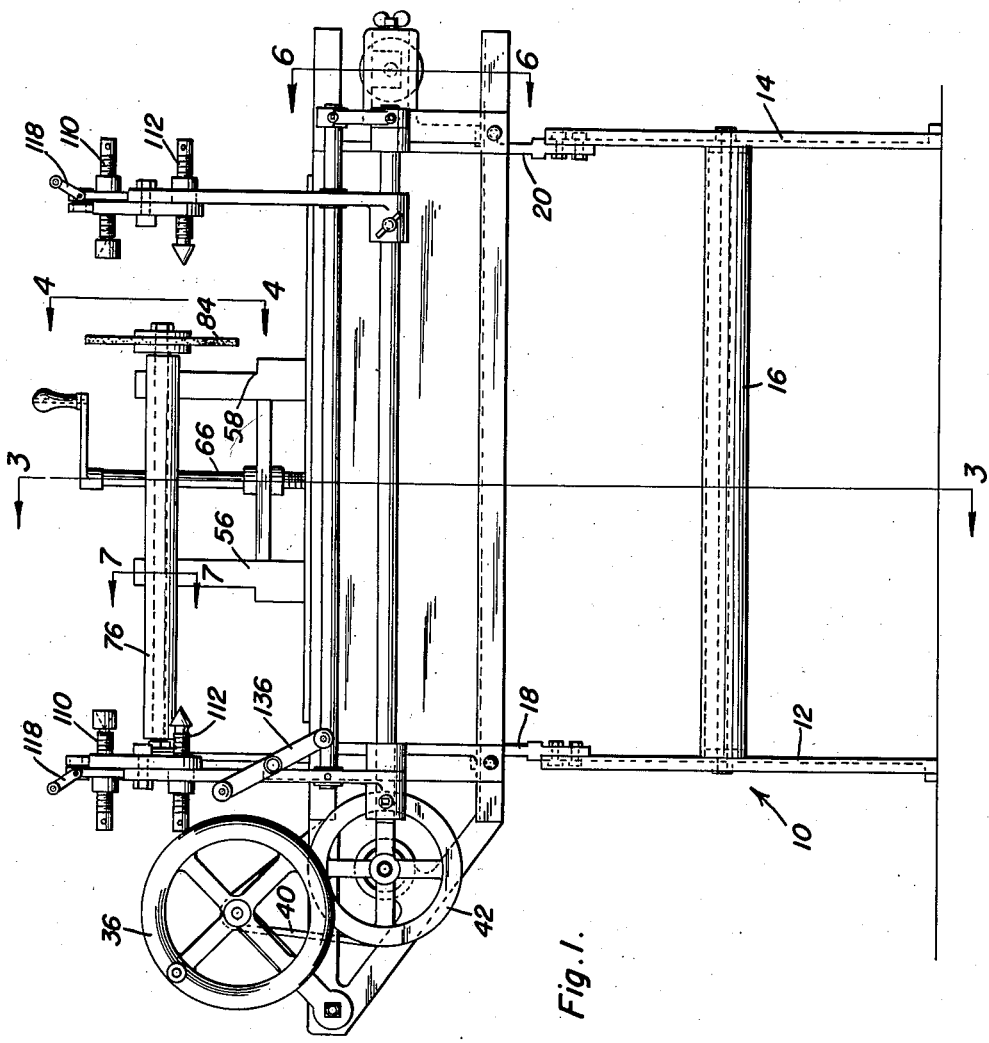
Figure 1 is an elevational side view of the preferred form of the present invention.
Figure 7:
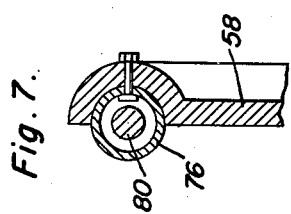
Figure 7 is a sectional view of the abrading means shaft housing retaining means.

This invention has been conceived and developed for the purpose of more efficaciously and conveniently sharpening lawn mower blades without the necessity of removing the said blades from the other appurtenances contiguous to lawn mowers. It is within the purview of the present invention to sharpen the lawn mower blades by retaining the actual lawn mower in a fixed position, moving an abrading means over the said blades within the lawn mower in a single plane, and rotating the said blade to provide this mutually perpendicular construction between the edge of the blades and the abrading means.

The utility of the present invention renders sharpening conventional lawn mower blades very simple and easy; it only need be necessary to adjust the mechanism and slide the abrading means in a single plane, the lawn mower blades rotating the proper amount automatically.

A base, generally indicated at 10, is provided and is preferably composed of a pair of leg members 12 and 14, respectively, having a cross member 16 extending therebetween for support purposes. The base extends through the utility of plates 18 and 20, respectively, which are detachably secured to the leg members 12 and 14. The rail 22 is secured to the said extensions or plates 18 and 20 and has a relatively sharp top edge 24 longitudinally thereof. A carriage is slidably received on the said rail 22 and is provided with a detent complemental to the sharpened portion 24 for engagement with said sharpened portion. The said carriage is composed of a plurality of members 26 and 28, connected with cross members. A table 30 extends from the said carriage and a motor 32 is secured to the said table.

Means for slidably actuating the said carriage is provided. This actuating means may be seen best in Figure 2, wherein there is disclosed an arm 34 secured to the said base having a wheel 36 journaled therein. A pulley 38 is operatively associated with the said wheel 36 and a belt 40 extends therearound. This belt also extends around a second large wheel or pulley 42 which is also journaled in the said base. Operatively associated with the pulley 42 is a gear 46 having a chain 48 extending therearound. Adjustably positioned at the opposite end of the said frame 10 is another idler pulley or gear 50 about which extends the said chain 48.

Going now to Figure 3, it will be noted that the said chain 46 is rigidly secured to the said carriage through the medium of a pin 52 and extends over a second idler pulley 54 journaled in the said rail 22. It may be appreciated that upon rotation of the wheel 36, the carriage will be slid longitudinally of the said rail 22.

A frame is adjustably received in the said carriage for the purpose of supporting an abrading means. This frame is composed of a pair of rods 56 and 58, respectively, which are slidably received in suitable tracks 60 forming a part of the said carriage. Suitable cross members are secured between the said frame for the obvious purpose of adding rigidity thereto. A bracket 62 extends from the said last-mentioned cross member means and forms a bearing for a shaft 66. This shaft 66 has collars 68 and 70 secured in spaced relation thereon. Each of the said collars is positioned on an opposite side of the said brackets 62, thereby preventing axial movement of the said shaft 66, relative to the frame. A perch 72 extends from the carriage and is internally threaded, complemental to the threads on the shaft 66. A suitable handle 74 may be detachably secured to a terminal portion of the said shaft 66 for actuation thereof. It is obvious that upon rotation of the shaft in a selected direction, the frame will be raised and lowered selectively.

The terminal portions of the said carriage members 56 and 58 are apertured for the purpose of receiving a hollow shaft 76 therein. This hollow shaft has internal anti-friction bearings 78 at opposite ends thereof for the purpose of journaling a work shaft 80 therein. For this construction, reference is made primarily to Figure 5. It will also be noted that a pulley 82 is secured to one end of said shaft 80 while abrading means 84 is detachably associated with a reduced portion 86 of the said shaft 80.

The said pulley 82 has a belt 88 extending therearound, which belt also extends around a pulley 90 detachably associated with the armature shaft of the motor 32.

It is quite evident that upon lifting and lowering of the shaft 80, the belt 88 will be pulled therewith. Accordingly, the motor 32, being positioned on the plate 30, is so arranged as to move pivotally therewith. For this construction, reference is made primarily to Figures 2 and 3. It will be seen that the table 30 is provided with eye members 92, as also the carriage. A pivot pin 94 then extends through all of the said eye members, thereby rendering the motor pivotal about the pivot pin 94 as an axis.

It will be here noted that the idler gear 50 is adjustable relative to the longitudinal axis of the rail 22. Going to Figure 6, it will be seen that an insert 96 is slidably received within an extension 98 provided on the base 10. Friction means 100, preferably a screw, is received in the said slidable means 96 and engageable with the stub shaft 102 on which the said idler pulley 50 is journaled.

Means for supporting a lawn mower is provided. This means consists of a pair of supports 104 and 106, respectively, which are operatively associated with the said base. A pair of identical lawn mower engaging ends are provided on each of the said supports 104 and 106, respectively. Going to Figure 3, it will be seen that a link 108 is pivoted centrally thereof to the said support 104. An upper screw 110 is adjustably received in the said link 108 and has a cup-like housing at the terminal portion thereof. This housing is for the purpose of engaging the shaft means of a lawn mower. The lower screw 112 has a conical point thereon for the purpose of engaging another selected element of a conventional lawn mower in the retention of the lawn mower between the supports 104 and 106. Now, a perch 114 is secured to the said support 104 and a screw threaded shaft 118 extends therethrough. This shaft also extends through the member connecting the upper portion of the link 108 thereto. By this medium, the angle of inclination of the link 108 may be adjusted. Means for resiliently biasing said link in a selected position is also provided. This means is preferably a spring 120 extending from the lower portion of the said link to a suitable eye member 122 integral with the support 104.

It is noted that the supports 104 and 106 are pivoted at 126 to the said base. A rod 128 having an internally threaded bearing 130 at the terminal portion thereof is provided. Extending into the said bearing 130 is an externally threaded shaft 132 which also extends through a suitable bearing 134 provided in the said support 104. Suitable handle means 136 is associated with the terminal portion of the said threaded shaft 132 for the obvious purpose of applying torque to the said shaft. By adjustment of this threaded shaft 132, the entire assemblage for retaining the lawn mower may be pivotally adjusted.

After the lawn mower is rigidly attached on the pertinent securing means, the sharpening operation begins. Going now to Figure 4, it will be noted that a plate 136 is attached adjacent the hollow shaft 76 and has a lip 138 associated therewith. This lip engages the blades 140 of the said lawn mower, thereby turning the said blades about their normal shaft for supplying fresh surface or edge of the lawn mower blades in a perpendicular position relative to the grindstone or abrading means 84.

In this manner and by the above described structure, lawn mower blades may be easily, conveniently and economically sharpened.

Due to the extreme simplicity of operation of this invention, a further description thereof is deemed unnecessary. However, it is apparent that various departures may be made from this invention without departing from the spirit thereof. Accordingly, limitation is sought only in accordance with the scope of the following claims.

Having described the invention, what is claimed as new is:

A lawn mower sharpener comprising a base, a rail secured to said base and a carriage slidably disposed on said rail, a frame vertically movable on said carriage, and threaded means reacting on said carriage for retaining said frame in preselected vertical positions, a shaft mounted for rotation on said frame adapted to support an abrading means, a hand wheel mounted on said base, and means drivingly connecting said hand wheel and said carriage to slidably actuate said carriage, a motor, a table pivoted to said carriage supporting said motor, and means drivingly connecting said shaft and said motor, a pair of supports mounted on said base, links pivoted to said supports, upper screws mounted on said links adapted to engage the shaft of a lawn mower, and lower screws carried by said links to engage a lawn mower component, and means carried by said supports for adjusting the angle of inclination of said links.

ALBERT C. THOMPSON.

REFERENCES CITED

The following references are of record in the file of this patent:

UNITED STATES PATENTS

| Number | Name | Date |
|---|---|---|
| 2,187,289 | Utterback | Jan. 16, 1940 |
| 2,279,798 | Shelburne | Apr. 14, 1942 |
| 2,314,945 | Maynard et al. | Mar. 30, 1943 |